(Model.)
J. WEATHERS.
LIFTING JACK.
No. 254,076. Patented Feb. 21, 1882.
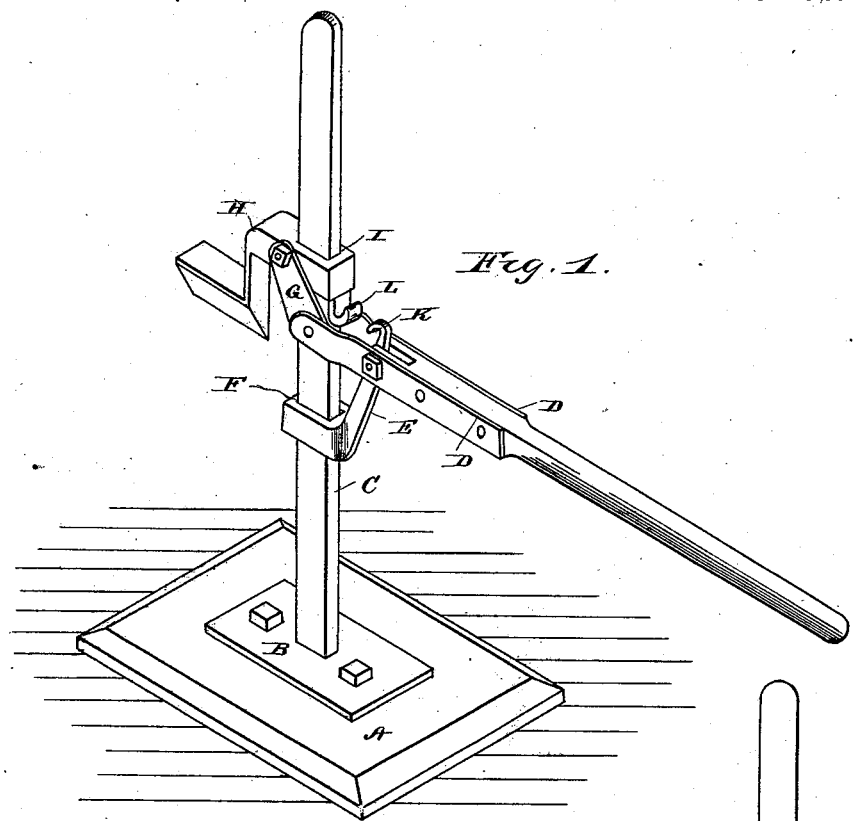
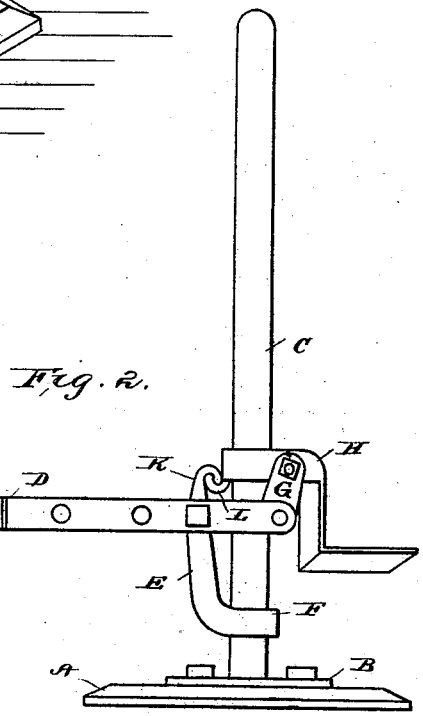
Witnesses.
Edward L. Yewell.
J. J. McCarthy.
Inventors.
James Weathers
By C. M. Alexander
Attorney.

United States Patent Office.

JAMES WEATHERS, OF INDIANAPOLIS, INDIANA, ASSIGNOR OF ONE-HALF TO JOHN A. ROBBINS, OF SAME PLACE.

LIFTING-JACK.

SPECIFICATION forming part of Letters Patent No. 254,076, dated February 21, 1882.

Application filed January 12, 1882. (Model.)

*To all whom it may concern:*

Be it known that I, JAMES WEATHERS, of Indianapolis, in the county of Marion, and in the State of Indiana, have invented certain new and useful Improvements in Lifting-Jacks; and I do hereby declare that the following is a full, clear, and exact description thereof, reference being had to the accompanying drawings, and to the letters of reference marked thereon, making a part of this specification.

This invention has for its object to provide a self-adjusting lifting-jack, whereby the side of a vehicle or any other heavy object may be elevated and held and afterward lowered to its original position, as more fully hereinafter specified. These objects I attain by the devices and mechanism illustrated in the accompanying drawings, in which—

Figure 1 represents a perspective view of my improved lifting-jack, and Fig. 2 a side elevation of the same.

The letter A indicates the base of the lifting-jack; and B a metallic plate bolted thereto, which is provided with a vertical standard, C.

D indicates a lever fulcrumed to a dog, E, which is provided with a rectangular opening, F, and sets over and is adapted to slide upon the standard C. The short arm of the lever is bifurcated as indicated, and the members embrace the sides of the standard C. To the said members are pivoted the links G, which are loosely connected to a bent bracket, H, which is provided with a rectangular slot, I, and is adapted to slide vertically upon the standard C. The upper end of the dog E is provided with a hook, K, which may be made to engage a hook, I, on the bracket H, when desired, for the purpose more fully hereinafter specified.

The operation of my invention is as follows: The horizontal arm of the bent bracket H is placed under the object to be elevated. The lever is then elevated at the rear, raising the dog E. Upon depressing the lever the strain causes the dog to bind upon the standard, elevating the bracket to a certain extent. If desired to further raise the object, the lever is again elevated. The weight of the object causes the bracket to bind upon the standard and prevents it from slipping back. In the meantime the strain has been taken off the dog and it is elevated to a new position, after which the lever is again depressed, putting the strain upon the dog, causing it to bind as before, and elevating the bracket again. When it is desired to release the object or return it to its original position the lever is elevated until the hook on the dog can be made to engage the hook on the bracket when the two are interlocked. This holds the slot in the bracket and dog in line, and prevents either from binding upon the standard, thus permitting the bracket, lever, and dog to drop and with the same the object elevated.

Having thus described my invention, what I claim, and desire to secure by Letters Patent, is—

1. In a lifting-jack, the combination of the vertical standard, the dog adapted to slide upon the same, the lever fulcrumed thereto, and the slotted bracket adapted to slide upon the standard and connected to the lever by suitable links, the whole arranged to operate substantially in the manner specified.

2. In combination with the standard, the dog, the lever, and the bracket and the engaging-hook on the dog and bracket, substantially as and for the purposes specified.

In testimony whereof I affix my signature, in presence of two witnesses, this 6th day of January, 1882.

JAMES WEATHERS.

Witnesses:
J. D. CONDT,
A. P. STANTON.